(12) United States Patent
Capron

(10) Patent No.: US 12,466,328 B2
(45) Date of Patent: Nov. 11, 2025

(54) FOLDABLE AND LOCKABLE GOLF CART RACK

(71) Applicant: Gerard Capron, Summerville, SC (US)

(72) Inventor: Gerard Capron, Summerville, SC (US)

( * ) Notice: Subject to any disclaimer, the term of this patent is extended or adjusted under 35 U.S.C. 154(b) by 0 days.

(21) Appl. No.: 18/420,309

(22) Filed: Jan. 23, 2024

(65) Prior Publication Data

US 2025/0236242 A1   Jul. 24, 2025

(51) Int. Cl.
*B60R 9/06* (2006.01)

(52) U.S. Cl.
CPC ..................... *B60R 9/06* (2013.01)

(58) Field of Classification Search
CPC ..... B60R 9/06; B60R 9/10; B60R 2011/0082; B62H 3/12; Y10S 224/924; B66C 23/44; B66C 23/42; B66C 23/48
USPC ........ 211/118, 22, 116, 88.04; 212/180, 299; 224/405, 523, 532, 924; 248/165, 308, 248/96; 414/462
See application file for complete search history.

(56) References Cited

U.S. PATENT DOCUMENTS

| | | | | |
|---|---|---|---|---|
| 3,794,227 A * | 2/1974 | Stearns | ..................... | B60R 9/10 224/532 |
| 3,927,811 A * | 12/1975 | Nussbaum | ................ | B60R 9/10 224/532 |
| 4,336,897 A * | 6/1982 | Luck | .......................... | B60R 9/10 224/532 |
| 4,394,948 A * | 7/1983 | Graber | ..................... | B60R 9/06 224/493 |
| 4,502,619 A * | 3/1985 | Cox | .......................... | B60P 7/15 410/127 |
| 5,052,604 A * | 10/1991 | Tourangeau | ............. | B62J 11/00 224/493 |
| 5,303,858 A | 4/1994 | Price | | |
| 5,363,996 A * | 11/1994 | Raaber | ..................... | B60R 9/06 224/532 |
| 5,435,472 A * | 7/1995 | Allen | ........................ | B60R 9/06 224/508 |
| 5,662,254 A * | 9/1997 | Lemajeur | .............. | B60R 9/0485 248/242 |
| 5,662,256 A * | 9/1997 | Bryan | ....................... | B60R 9/10 224/523 |
| 5,845,832 A | 12/1998 | Eichmann | | |
| 6,089,428 A * | 7/2000 | Wagner | ..................... | B60R 9/10 224/511 |
| 6,202,868 B1 * | 3/2001 | Murray | ................ | B60P 1/5495 452/187 |
| 6,705,821 B2 * | 3/2004 | Philipps | ................ | B60P 1/5471 414/462 |
| 7,766,202 B2 | 8/2010 | Depot | | |
| 7,784,657 B2 | 8/2010 | Blakeley | | |

(Continued)

FOREIGN PATENT DOCUMENTS

CN    210652912    7/2019

*Primary Examiner* — Gregory W Adams
(74) *Attorney, Agent, or Firm* — Bill Killough

(57) ABSTRACT

A foldable and lockable golf cart rack that extends from a rear seat grab bar of a golf cart. A pair of foldable rack members extend generally horizontally from the support members, and are secured relative to vertical support members by a locking device. The rack members are rotatable relative to a pivot point by disabling the locking device. The rack members are pivoted to so as to be positioned and secured in a second configuration by a retainer that is located below the pivot point.

19 Claims, 3 Drawing Sheets

(56) References Cited

U.S. PATENT DOCUMENTS

| | | | |
|---|---|---|---|
| 8,220,678 B2 * | 7/2012 | Bove | B60R 9/10 |
| | | | 224/314 |
| 8,235,267 B2 | 8/2012 | Sautter et al. | |
| 8,662,363 B2 * | 3/2014 | Williams | A63B 57/00 |
| | | | 14/21 |
| 8,777,288 B2 | 7/2014 | Johnasen | |
| 8,844,738 B2 * | 9/2014 | Thompson | B66C 23/48 |
| | | | 212/294 |
| 9,346,409 B2 | 5/2016 | Pfaeffi | |
| 9,358,933 B2 * | 6/2016 | Phillips | B60R 9/10 |
| 9,487,152 B2 | 11/2016 | Scott et al. | |
| 10,351,070 B2 | 7/2019 | Badillo | |
| 10,780,837 B2 | 9/2020 | Sautter et al. | |
| 2008/0149583 A1 * | 6/2008 | Welker | B66C 23/44 |
| | | | 212/180 |
| 2011/0053482 A1 * | 3/2011 | Mckenzie | A22B 5/06 |
| | | | 452/187 |
| 2020/0353804 A1 | 11/2020 | Flores | |

* cited by examiner

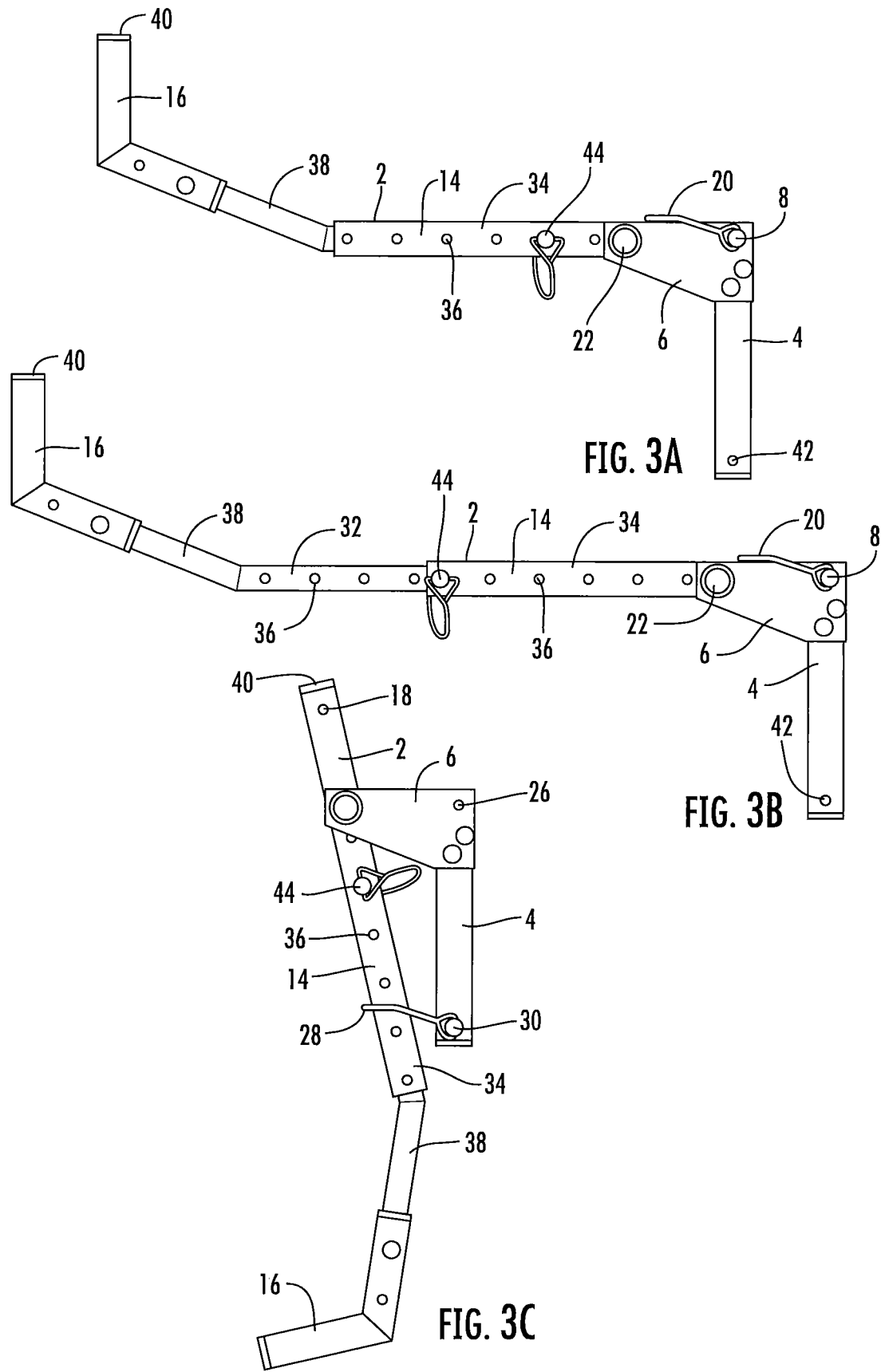

FOLDABLE AND LOCKABLE GOLF CART RACK

BACKGROUND FOR THE INVENTION

Golf carts are increasingly used as transportation for people and objects as the use of electric vehicles increases. This use of golf carts has little or nothing to do with the game of golf, and therefore, "golf cart" is a misnomer for the device as used for human transportation on streets. However, the term "golf cart" remains in widespread use to describe these vehicles, and is used herein. Not all golf carts are electric, and the use of the invention described herein is not limited to electric golf carts.

Golf carts are commonly used for short range transportation in subdivisions and housing communities. Golf carts of this type and use have a rear seat for occupants in addition to the front seat found in golf carts used on golf courses. The rear seat typically has a grab bar for the rear seat occupants to hold. The rear seat grab bar comprises two spaced apart and parallel vertical members connected by an upper connecting member or portion. The rear seat grab bar is usually mounted at the extreme rear of the golf cart.

Golf carts for transportation are used to transport objects in addition to people. However, golf carts with rear seats have limited space for transporting objects. For example, users of the golf cart may transport lawn chairs, bags with handles, or other objects for use upon arrival at a destination, such as a pool or a beach. There is a need for a golf cart rack that increases the hauling capacity of the golf cart, with the rack capable of being folded out of the way when not in use.

SUMMARY OF THE INVENTION

The present invention is a foldable and lockable golf cart rack that extends from a rear seat grab bar of a golf cart. A pair of foldable rack members extend generally horizontally from the support members, and are secured in position relative to vertical support members by a locking device. The rack members are rotatable about a pivot point by disabling the locking device. The rack members may be pivoted so as to be positioned and secured in a second configuration by a retainer that is located below the pivot point.

BRIEF DRAWING DESCRIPTION

FIG. 3A shows assembled elements of the foldable and lockable golf cart rack positioned generally horizontally for use and telescoped to reduce its length.

FIG. 3B shows assembled elements of the foldable and lockable golf cart rack positioned generally horizontally and extended to expand its length.

FIG. 3C shows assembled elements of the foldable and lockable golf cart rack folded away and positioned generally vertically.

DESCRIPTION OF PREFERRED EMBODIMENTS

Figure 2:
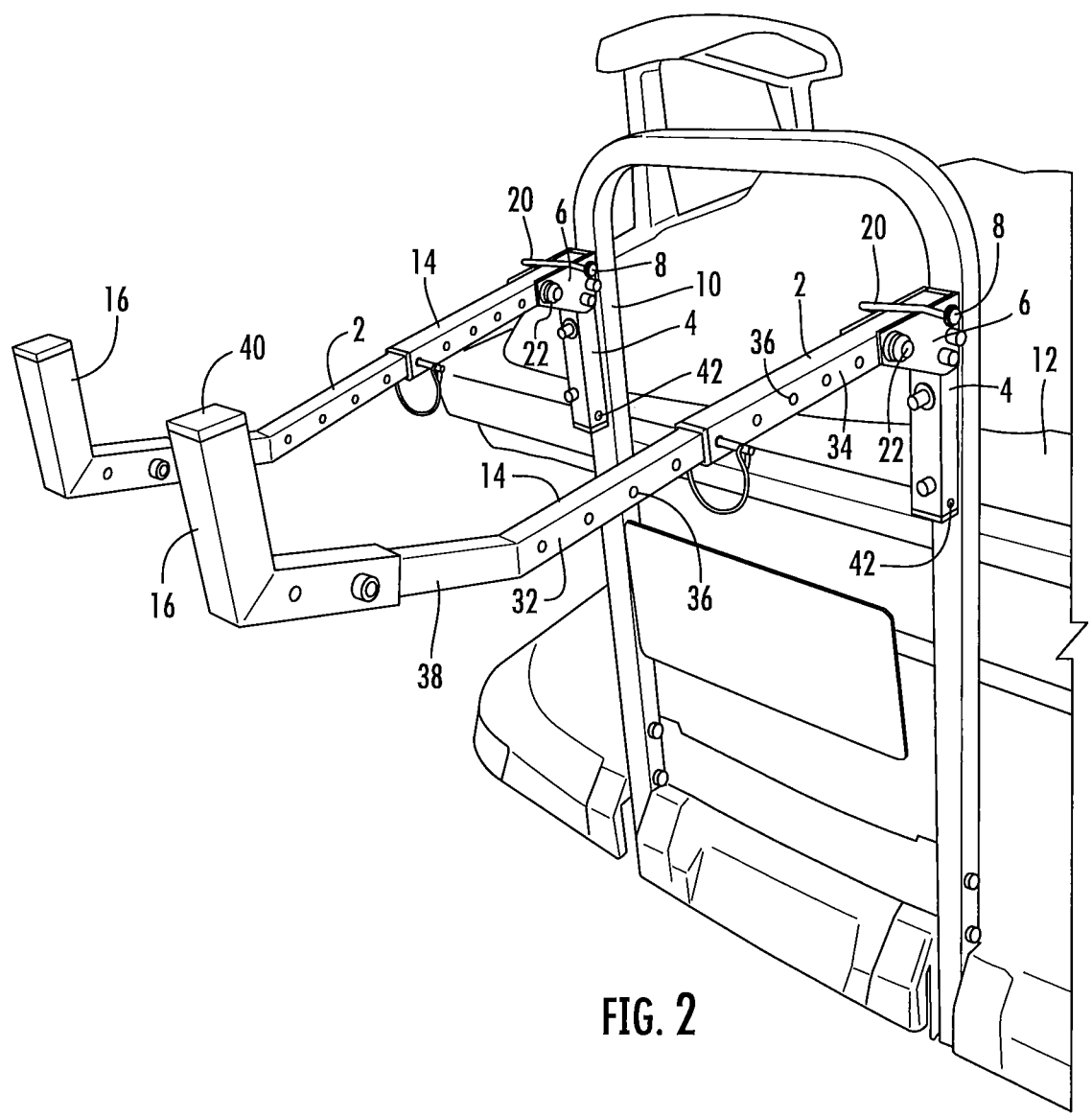
FIG. 2 shows the foldable and lockable golf cart extended for use in transporting objects.

FIG. 2 shows the foldable and lockable golf cart rack in position for use in transporting objects by the golf cart. A pair of rack members 2 extend away from a rear seat 24 grab bar 10 of a golf cart 12. Each rack member in the configuration shown comprises a generally horizonal portion 14 and an upwardly extending portion 16 at a distal end of the rack member in this configuration, and in position for use in carrying objects. The rack members are spaced apart and are generally parallel to each other as shown in FIG. 2.

The rack members 2 are mounted to the rear seat grab bar 10 of the golf cart. As shown in the drawings, the rack members are attached to vertical support members 4 that are constructed and arranged for mounting to the rear seat grab bar. The support members are positioned generally vertically on the rear seat grab bar in the embodiment shown in the drawings. Outwardly extending arms 6 are mounted to the vertical support members and connect the vertical support members to the rack members. The rack members are mounted to the vertical support members by a pivot point 22 on the arms 6 that allows the rack members to rotate from the position shown in FIG. 1 to the position shown in FIG. 2. Proximal ends of the rack members are positioned within the arms of the support members when the foldable and lockable golf cart rack is in the position shown in FIG. 2.

An embodiment of a locking device is shown in FIG. 2. A locking pin 8 is inserted through a void 26 formed in the arms 6 and through a void 18 in the proximal end of each rack member 2 to hold the foldable and lockable golf cart rack in the horizontal position shown in FIG. 2. The pins are preferred to have a bail 20 or a cotter pin or similar object to hold the pins in place while the foldable and lockable golf cart rack is in the generally horizontal position and in use. Locking pins 8 are preferred to be inserted into the rack members and arms between the pivot point and the proximal end of the rack members to lock the rack members in the generally horizontal position.

The rear seat grab bar 10 may be manufactured to incorporate or provide for the arms 6 that provide functioning of the foldable rack members 2 as disclosed herein, rather than having separate vertical support members 4. As shown in the drawings, the vertical support members are separate parts that are affixed to rear seat grab bars that are currently known and in use. In another embodiment, the arms may be mounted directly to the rear seat grab bars. The vertical portion of the rear seat grab bars are the vertical support members in the another embodiment.

The term "proximal" as used herein means the end of the rack members 2 closest to the rear of the golf cart 12, and the term "distal" means the opposite end of the rack members that are furthest from the rear of the golf cart when the rack members are in the generally horizontal position as shown in FIG. 2.

Figure 1:
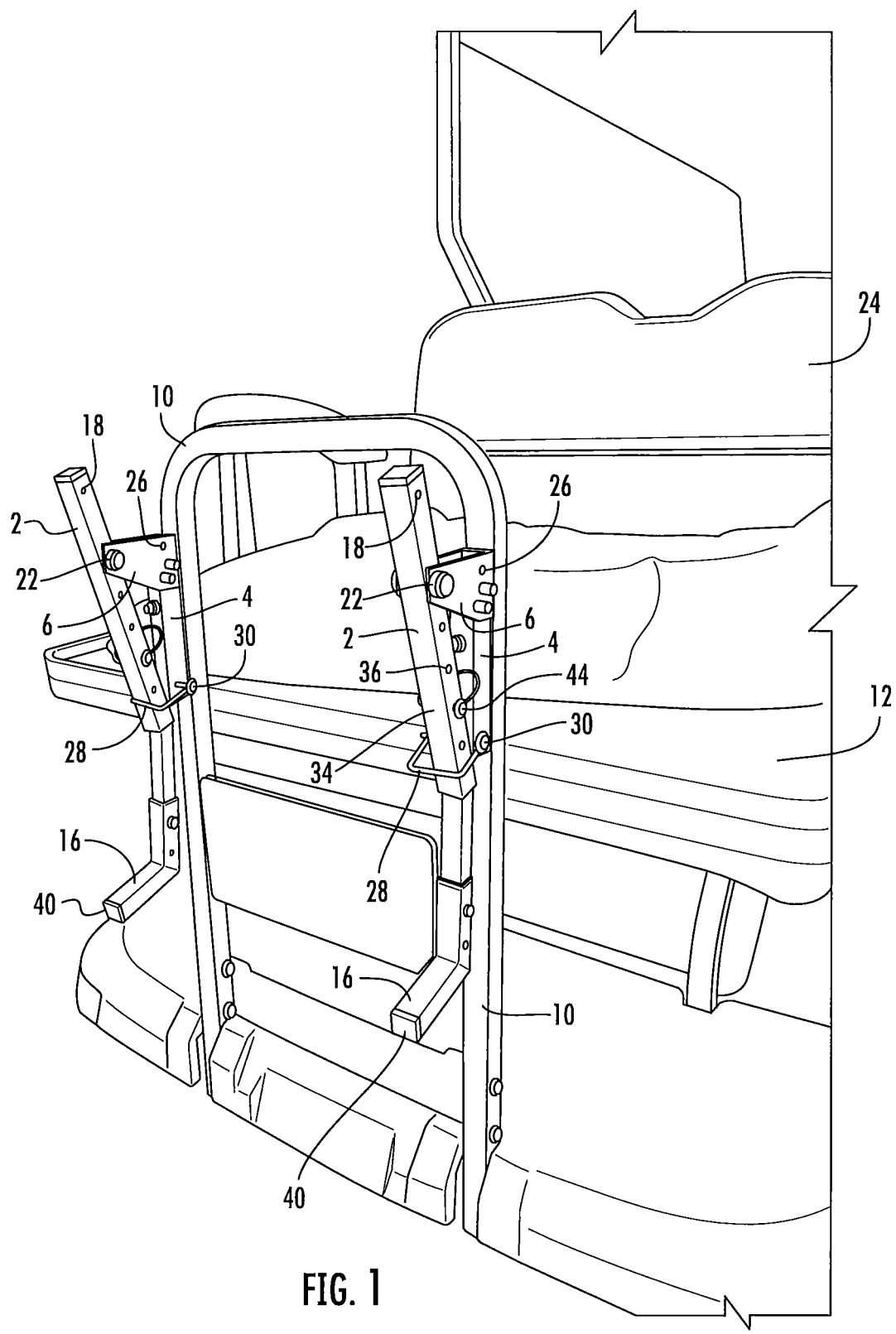
FIG. 1 shows the foldable and lockable golf cart rack folded and secured when not in position for use in transporting objects.

As shown in FIG. 1, the rack members 2 are rotated about pivot point 22 so that the rack members do not extend materially outward from the golf cart. The positioning of the foldable and lockable golf cart rack as shown in FIG. 1 is described herein as the rack members being positioned generally vertically. The rack members as shown in FIG. 2 are referred to herein as being positioned generally horizontally. Folding and securing the rack members to the generally vertical position prevents the rack members from extending materially beyond the rear of the golf cart so that the rack members are less likely to strike other objects or be struck by other objects, since the rack members are less visible when not carrying beach chairs or other objects.

The rack members 2 shown in the position of FIG. 1 are locked or secured in the vertical position. A retainer holds the rack members in the vertical position. The retainer as shown in FIG. 1 is bail 28 that extends from a first end of pin 30 and is removably attached to the opposite end of the pin. The locking pin is inserted through void 42 in the vertical support member 4 when the rack members are positioned vertically, so that a bail surrounds each rack member. The opposite end of the bail is connected to the opposite end of the pin. The locking pin and bail retain the rack member and foldable and lockable golf cart rack in place in the vertical position, especially as the golf cart travels over bumps and other obstacles. The same pin and bail construct may be used as part of the locking device for holding the rack members within the arms 6 and in the horizontal position as described herein.

As shown in FIG. 3A, each rack member 2 has a generally horizontal portion 14 that preferably extends along a majority of the length of the rack member. However, the horizontal portion of the rack member is preferred to be length adjustable. The horizontal portion of the rack member may be contracted as shown in FIG. 3A, or expanded as shown in FIG. 3B. In the embodiment shown, an internal member 32 and an external member 34 of the rack member slidably engage in a telescoping manner. A series of voids 36 is provided in at least the internal member. A void in the external member receives a pin 44 that extends through one of the voids in the internal member after a preferred length of the rack member is determined by the user. The plurality of voids provide selectability in establishing the desired length of the rack member.

The rack members 2 have an upturned portion 16 at the distal end of the rack members in the embodiment shown in FIGS. 3A and 3B. The upturned portion inhibits articles that are positioned on the rack members, such as lawn chairs or beach chairs, from sliding off of the foldable and lockable golf cart rack as the golf cart travels.

The foldable and lockable golf cart rack is particularly well suited for transporting objects like beach chairs, bags with straps and other articles that have a member that can be hung from one or both of the rack members. For example, beach chairs typically comprise a connecting member that connects a first vertical member or leg to a second vertical member or leg of the beach chair. This connecting member is positioned over both of the rack members 2 of the pair of rack members to transport the beach chair.

The rack members 2 may have a dogleg portion 38. The dogleg portion is an upwardly sloping portion of the rack members between the generally horizontal portion 14 of the rack members and the upwardly turned portion 16 of the rack members. FIG. 2. The dogleg portion assists in retaining articles on the foldable and lockable golf cart rack. The dogleg portion also helps is loading articles onto the rack members. As articles are lifted over the upturned portion and placed on the dogleg portion, the articles to be transported by the golf cart will tend to slide down and toward the generally horizontal portion of the rack member.

Resilient inserts 40 formed of polymers or other plastics, or rubber, may be positioned in one or both ends of the tubes from which the rack members 2 are constructed. Resilient members that act as stops may be placed within the arms against which the rack members rest when the rack members are in the horizontal position.

FIG. 3C shows a rack member secured by the retainer 28. The rack member 2 is unlocked from the horizontal position and held in the vertical position in this view.

What is claimed:

1. A foldable and lockable golf cart rack, comprising:
   a pair of arms, with each arm of the pair of arms extending outwardly from a vertical support member of a pair of spaced apart vertical support members; and
   a pair of rack members, each rack member comprising a generally horizonal portion when the pair of rack members are in a first configuration, wherein each rack member of the pair of rack members is pivotally mounted at a pivot point to a corresponding arm of the pair of arms;
   a pair of locking devices, each locking device of the pair of locking devices positioned between the pivot point and the proximal end of the rack member of the pair of rack members when the rack members are in the first configuration;
   wherein, in a second configuration, each rack member of the pair of rack members is positioned and secured in the second configuration by a retainer that is located below the pivot point, and the proximal ends of the pair of rack members extend from and above the pair of arms; and
   wherein a rear seat grab bar that is mounted to a golf vehicle comprises the vertical support members, with vertical members of the rear seat grab bar joined to each other at an upper portion of the vertical members of the rear seat grab bar.

2. A foldable and lockable golf cart rack as described in claim 1, wherein the retainer comprises a pin that is positioned within the vertical support member, and a bail that surrounds the rack member and is attached to the pin.

3. A foldable and lockable golf cart rack as described in claim 1, wherein, in the second configuration, the pair of rack members are positioned in a generally vertical orientation.

4. A foldable and lockable golf cart rack as described in claim 1, wherein each arm comprises spaced apart members and the proximal end of each of the rack members of the pair of rack members is positioned between the spaced apart members of the arms when the foldable and lockable golf cart rack is in the first configuration.

5. A foldable and lockable golf cart rack as described in claim 1, wherein the locking device is a pin that extends through a void formed in each a rack member of the pair of rack members and through a support member of the pair of support members.

6. A foldable and lockable golf cart rack as described in claim 1, wherein each rack support-member of the pair of rack members comprises an internal member that slidably engages an external member.

7. A foldable and lockable golf cart rack as described in claim 1, wherein each rack member comprises an upwardly extending portion at a distal end of the rack member when the pair of rack members are in the first configuration.

8. A foldable and lockable golf cart rack as described in claim 1, wherein each rack member comprises an upwardly sloping portion that is positioned between a generally horizontal portion of the rack member and an upwardly extending portion at a distal end of the rack member when the pair of rack members are in the first configuration.

9. A foldable and lockable golf cart rack as described in claim 1, wherein a first rack member of the pair of rack members is positioned generally parallel to a second rack member of the pair of rack members.

10. A foldable and lockable golf cart rack as described in claim 1, wherein the rack members are positioned opposite a rear seat grab bar from a golf vehicle to which the rear seat grab bar is mounted.

11. A foldable and lockable golf cart rack, comprising:
    a pair of arms, with each arm of the pair of arms extending outwardly from a vertical support member of a pair of spaced apart vertical support members; and rack members, each rack member comprising a generally horizonal portion when the rack members are in a first configuration, wherein each rack member of the rack members is pivotally mounted at a pivot point to a corresponding arm of the pair of arms, a pair of locking devices, each locking device of the pair of locking devices positioned between the pivot point and the proximal end of the rack member when the rack members are in the first configuration;

wherein, in a second configuration, each rack member of the pair of rack members rotates relative to the pivot point and is positioned and secured in the second configuration by a retainer that is located below the pivot point, and the proximal ends of the rack members extend from and above the pair of arms; and wherein the vertical support members are constructed and arranged to mount to a rear portion of a golf vehicle.

12. A foldable and lockable golf cart rack as described in claim 11, wherein the retainer comprises a pin that is positioned within the vertical support member, and a bail that surrounds the rack member and is attached to the pin.

13. A foldable and lockable golf cart rack as described in claim 11, wherein, in the second configuration, the pair of rack members are positioned in a generally vertical orientation.

14. A foldable and lockable golf cart rack as described in claim 11, wherein each arm of the vertical support members comprises spaced apart members and the proximal end of each of the rack members of the pair of rack members is positioned between the spaced apart members of the arms when the foldable and lockable golf cart rack is in the first configuration.

15. A foldable and lockable golf cart rack as described in claim 11, wherein the locking device is a pin that extends through a void formed in each rack member of the pair of rack members and through a support member of the pair of support members.

16. A foldable and lockable golf cart rack as described in claim 11, wherein each rack member of the pair of rack members comprises an internal member that slidably engages an external member.

17. A foldable and lockable golf cart rack as described in claim 11, wherein each rack member comprises an upwardly extending portion at a distal end of the rack member when the pair of rack members are in the first configuration.

18. A foldable and lockable golf cart rack as described in claim 11, wherein a first rack member of the pair of rack members is positioned generally parallel to a second rack member of the pair of rack members.

19. A foldable and lockable golf cart rack as described in claim 11, wherein the arms are constructed and arranged for mounting to a rear seat grab bar of a golf vehicle.

* * * * *